US012198597B2

(12) United States Patent
Hong et al.

(10) Patent No.: US 12,198,597 B2
(45) Date of Patent: Jan. 14, 2025

(54) ELECTRONIC DEVICE

(71) Applicant: InnoLux Corporation, Miao-Li County (TW)

(72) Inventors: Shuo-Ting Hong, Miao-Li County (TW); Chung-Le Chen, Miao-Li County (TW); Hung-Kun Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/407,771

(22) Filed: Jan. 9, 2024

(65) Prior Publication Data

US 2024/0282234 A1 Aug. 22, 2024

(30) Foreign Application Priority Data

Feb. 17, 2023 (CN) ......................... 202310129295.1

(51) Int. Cl.
*G09G 3/20* (2006.01)

(52) U.S. Cl.
CPC ... *G09G 3/2007* (2013.01); *G09G 2310/0297* (2013.01); *G09G 2320/0247* (2013.01); *G09G 2340/0435* (2013.01)

(58) Field of Classification Search
CPC ... G09G 2320/0247; G09G 2340/0435; G09G 2310/0297
See application file for complete search history.

(56) References Cited

U.S. PATENT DOCUMENTS

| | | | | |
|---|---|---|---|---|
| 10,923,012 | B1 | 2/2021 | Hu | |
| 2018/0239477 | A1* | 8/2018 | Yang | G09G 3/2074 |
| 2020/0183240 | A1* | 6/2020 | Hsieh | G02F 1/1345 |

* cited by examiner

*Primary Examiner* — Abbas I Abdulselam
(74) *Attorney, Agent, or Firm* — McClure, Qualey & Rodack, LLP

(57) ABSTRACT

An electronic device includes a substrate, an electrical component, a plurality of data lines, a plurality of fan-out lines and a multiplexer. The substrate includes an active area and a fan-out area. The electrical component is disposed in the active area. The data lines are disposed in the active area, and one of the data lines is coupled to the electrical component. The fan-out lines are disposed in the fan-out area. The multiplexer is disposed between the active area and the fan-out area, and is coupled to the one of the data lines and one of the fan-out lines. The electronic device has various refreshing frequencies and is configured to use the multiplexer to control the one of the data lines to receive a data signal through the one of the fan-out lines, and the electrical component displays a corresponding gray-level according to the data signal.

20 Claims, 5 Drawing Sheets

ELECTRONIC DEVICE

CROSS REFERENCE TO RELATED APPLICATIONS

This application claims priority of China Patent Application No. 202310129295.1, filed on Feb. 17, 2023, the entirety of which is incorporated by reference herein.

BACKGROUND OF THE DISCLOSURE

Field of the Disclosure

The disclosure relates to an electronic device, and in particular, to an electronic device capable of improving the flicker of a gray-level.

Description of the Related Art

In conventional display devices, when the multiplexer is turned off, it may generate a feed-through effect, so that the positive polarity voltage and the negative polarity voltage of the data lines and the common voltage of the display device are unevenly distributed, thereby causing a problem with flickering of the gray-levels. This will adversely affect the experience of the user. Therefore, a new design for a circuit structure is needed to solve this problem.

BRIEF SUMMARY OF THE DISCLOSURE

An embodiment of the disclosure provides an electronic device, which includes a substrate, an electrical component, a plurality of data lines, a plurality of fan-out lines and a multiplexer. The substrate includes an active area and a fan-out area. The electrical component is disposed in the active area. The data lines are disposed in the active area, and one of the data lines is coupled to the electrical component. The fan-out lines are disposed in the fan-out area. The multiplexer is disposed between the active area and the fan-out area, and coupled to the one of the data lines and one of the fan-out lines. The electronic device has various refreshing frequencies and is configured to use the multiplexer to control the one of the data lines to receive a data signal through the one of the fan-out lines, and the electrical component displays a corresponding gray-level according to the data signal.

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Figure 1:
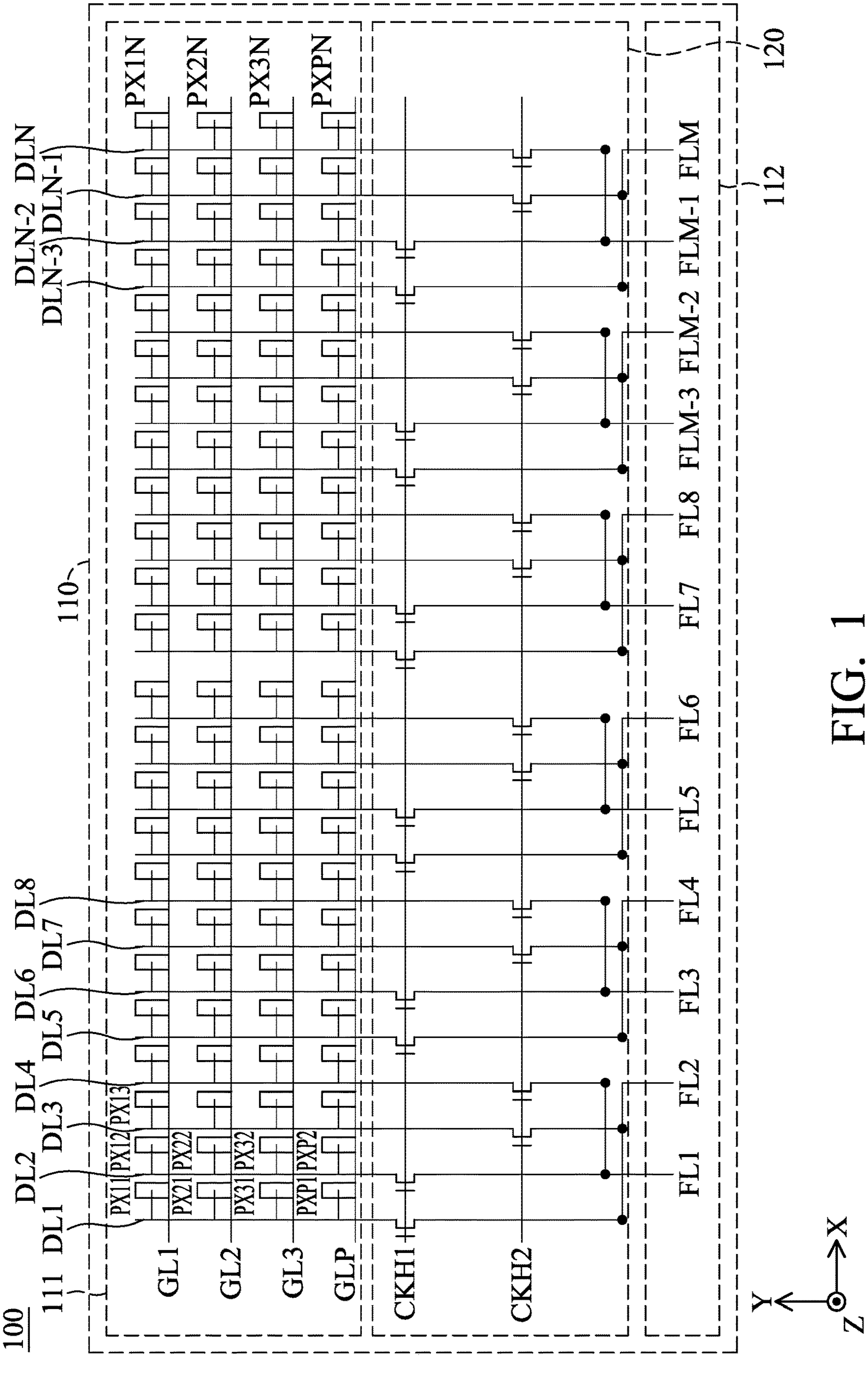
FIG. 1 is a schematic view of an electronic device according to an embodiment of the disclosure.

In order to make objects, features and advantages of the disclosure more obvious and easily understood, the embodiments are described below, and the detailed description is made in conjunction with the drawings. In order to help the reader to understand the drawings, the multiple drawings in the disclosure may depict a part of the entire device, and the specific components in the drawing are not drawn to scale.

The specification of the disclosure provides various embodiments to illustrate the technical features of the various embodiments of the disclosure. The configuration, quantity, and size of each component in the embodiments are for illustrative purposes, and are not intended to limit the disclosure. In addition, if the reference number of a component in the embodiments and the drawings appears repeatedly, it is for the purpose of simplifying the description, and does not mean to imply a relationship between different embodiments.

Furthermore, use of ordinal terms such as “first”, “second”, etc., in the specification and the claims to describe a claim element does not by itself connote and represent the claim element having any previous ordinal term, and does not represent the order of one claim element over another or the order of the manufacturing method, either. The ordinal terms are used as labels to distinguish one claim element having a certain name from another element having the same name.

In the disclosure, the technical features of the various embodiments may be replaced or combined with each other to complete other embodiments without being mutually exclusive.

In some embodiments of the disclosure, unless specifically defined, the term “coupled” or “electrically connected” may include any direct and indirect means of electrical connection.

In the text, the terms “substantially” or “approximately” usually means within 20%, or within 10%, or within 5%, or within 3%, or within 2%, or within 1%, or within 0.5% of a given value or range. The quantity given here is an approximate quantity. That is, without the specific description of “substantially” or “approximately”, the meaning of “substantially” or “approximately” may still be implied.

The “including” mentioned in the entire specification and claims is an open term, so it should be interpreted as “including or comprising but not limited to”.

Furthermore, “connected or “coupled” herein includes any direct and indirect connection means. Therefore, an element or layer is referred to as being “connected to” or “coupled to” another element or layer, the element or layer can be directly on, connected or coupled to another element or layer or intervening elements or layers may be present. When an element is referred to as being “directly connected to” or “directly coupled to” another element or layer, there are no intervening elements or layers present. If the text describes that a first device on a circuit is coupled to a second device, it indicates that the first device may be directly electrically connected to the second device. When the first device is directly electrically connected to the second device, the first device and the second device are connected through conductive lines or passive elements (such as resistors, capacitors, etc.), and no other electronic elements are connected between the first device and the second device.

In an embodiment, the electronic device may include a display device, a backlight device, an antenna device, a sensing device, a splicing device or a therapeutic diagnosis device, but the disclosure is not limited thereto. The electronic device may be a bendable or flexible electronic device. The display device may be a non-self-luminous type display device or a self-luminous type display device. The antenna device may be a liquid-crystal type antenna device or a non-liquid-crystal type antenna device, and the sensing device may be a sensing device that senses capacitance, light, heat or ultrasound, but the disclosure is not limited thereto. The electronic component may include a passive component and an active component, such as a capacitor, a resistor, an inductor, a diode, a transistor, etc. The diode may include a light-emitting diode or a photodiode. The light-emitting diode may include, for example, an organic light-emitting diode (OLED), a mini LED, a micro LED or a quantum dot LED, but the disclosure is not limited thereto. The splicing device may be, for example, a display splicing device or an antenna splicing device, but the disclosure is not limited thereto. It should be noted that the electronic device may be any arrangement and combination of the above devices, but the disclosure is not limited thereto. Hereinafter, the display device will be used as an electronic device to illustrate to the content of the disclosure, but the disclosure is not limited thereto.

FIG. 1 is a schematic view of an electronic device according to an embodiment of the disclosure. Please refer to FIG. 1. The electronic device 100 may at least include a substrate 110, a plurality of electrical components PX11~PXPN, a plurality of data lines DL1~DLN, a plurality of fan-out lines FL1~FLM and a multiplexer 120, wherein N, M and P are positive integers greater than 1. In some embodiments, N may be greater than M, but the disclosure is not limited thereto. In addition, P and N may be the same or different, but the disclosure is not limited thereto. In addition, since the disclosure takes a display device as an example, the electrical components PX11~PXPN in the following content may be referred to as display units PX11~PXPN.

The substrate 110 may include an active area (AA) 111 and a fan-out area 112 (that is, in a top view, a part of the substrate 110 may be divided into the active area 111 and another part may be divided into the fan-out area 112). In the embodiments, the substrate 110 may include a rigid substrate or a flexible substrate, and the material of the substrate 110 may include glass, quartz, sapphire, ceramics, polycarbonate (PC), polyimide (PI), polyethylene terephthalate (PET), another suitable material, or a combination thereof, but the disclosure is not limited thereto.

The display units PX11~PXPN may be located in the active area 111. In the embodiments, the display units PX11~PXPN may be sub-pixels, but the disclosure is not limited thereto. In addition, the display units PX11~PXPN may be arranged in a matrix in the active area 111.

That data lines DL1~DLN may be disposed in the active area 111, and one of the data lines DL1~DLN may be correspondingly coupled to at least one of the display units PX11~PXPN. For example, the data line DL1 may be coupled to the display units PX11~PXP1. The data line DL2 may be coupled to the display units PX12~PXP2 . . . . The data line DLN may be coupled to the display units PX1N~PXPN.

The fan-out lines FL1~FLM may be disposed in the fan-out area 112. For the convenience of description, in the disclosure, the fan-out lines may be divided into a plurality of first fan-out lines and a plurality of second fan-out lines according to the arrangement order of the fan-out lines along a direction X (for example, a extending direction of an edge of the substrate 110). In the embodiment, the first fan-out lines are odd-numbered fan-out lines, such as the fan-out lines FL1, FL3, FL5, etc., and the second fan-out lines are even-numbered fan-out lines, such as the fan-out lines FL2, FL4, FL6, etc. Therefore, the first fan-out lines and the second fan-out lines may be staggered. However, it should be noted that the grouping of the first fan-out lines and the second fan-out lines in the disclosure is not limited to this. In the embodiment, the traces in the fan-out area 112 (such as the fan-out lines FL1~FLM) may be calculated from the end terminal of the signal pad, and the angle of the traces may be fanned out outward. Furthermore, although not shown in the figure, at least part of traces of the fan-out lines FL1~FLM in the fan-out area 112 may be inclined to the left or right. The above signal pads may be used to receive the data signal from a flexible printed circuit board (FPCB) on the substrate 110, but the disclosure is not limited thereto.

The multiplexer 120 may be disposed between the active area 111 and the fan-out area 112. In addition, the multiplexer 120 may be coupled to one of the data lines DL1~DLN and one of the fan-out lines FL1~FLM. That is, as shown in FIG. 1, the multiplexer 120 may be coupled to the data line DL1 and the fan-out line FL2, or the multiplexer 120 may be coupled to the data line DL2 and the fan-out line FL1, or the multiplexer 120 may be coupled to the data line DL5 and the fan-out line FL4. The rest of the multiplexer 120 coupled to other data lines and other fan-out lines may be deduced by analogy, but the disclosure is not limited thereto.

In the embodiment, the electronic device 100 may have various refreshing frequencies (such as variable refresh rate (VRR)), the electronic device 100 is configured to use the multiplexer 120 to control the one of the data lines DL1~DLN to receive a data signal through the one of the fan-out lines FL1~FLM, and one of the display units PX11~PXPN displays a corresponding gray-level according to the data signal. For example, the electronic device 100 may control the data line DL1 to receive the data signal through the multiplexer 120 and the second fan-out line FL2, and one of the display units PX11~PXP1 may display the corresponding gray-level according to the data signal. The electronic device 100 may control the data line DL2 to receive the data single through the multiplexer 120 and the first fan-out line FL1, and one of the display units PX12~PXP2 may display the corresponding gray-level according the data signal. The rest of operations the electronic device 100 may be deduced by analogy.

More specifically, as shown in FIG. 1, in the multiplexer 120, there may be a plurality of traces coupled to the fan-out lines FL1~FLM, and the data lines DL1~DLN may be coupled to one of the fan-out lines FL1~FLM through these traces in the multiplexer 120. In addition, in the traces of the multiplexer 120, the trace coupled to one of the fan-out lines FL1~FLM may cross the trace coupled to adjacent another of the fan-out lines FL1~FLM. For example, in FIG. 1, one of the two traces coupled to the first fan-out line FL1 crosses the trace coupled to the second fan-out line FL2.

In addition, the data signal transmitted by one of the second fan-out lines FL2 and FL4 and the data signal transmitted by the adjacent one of the fan-out lines FL1 and FL3 may have the same polarity, and the data signal transmitted by the one of the second fan-out lines FL2 and FL4 and the data signal transmitted by adjacent another of the fan-out lines FL1 and FL3 may have different polarities. For example, the data signal transmitted by the second fan-out line FL2 and the data signal transmitted by the first fan-out line FL3 may have the same polarity, and the data signal transmitted by the second fan-out line FL2 and the data signal transmitted by the first fan-out line FL1 may have different polarities. That is, the data signal transmitted by the first fan-out line FL1 may be the negative polarity, and the data signals transmitted by the second fan-out line FL2 and the first fan-out line FL3 may be the positive polarity, but the disclosure is not limited thereto. The polarities of the data signals of the rest of the fan-out lines FL4~FLM may be deduced by analogy. Therefore, the polarities of the data signal transmitted by the fan-out lines FL1~FLM may be referred to a square inversion.

In some embodiments, the data lines DL1~DLN may arranged along a direction (such as the X direction), and through the adjustment of the coupling order of the traces in the multiplexer 120 and the fan-out lines FL1~FLM, the data signals received by adjacent two of the data lines DL1~DLN may have different polarities. For example, the data signals received by the data line DL1 and the data line DL2 may have different polarities. That is, in the embodiment shown in FIG. 1, when the data signal transmitted by the first fan-out line FL1 is the negative polarity and the data signal transmitted by the second fan-out line FL2 is the positive polarity, the data signal received by the data line DL1 coupled to the second fan-out line FL2 may be the positive polarity, and the data signal received by the data line DL2 coupled to the first fan-out line FL1 may be the negative polarity, but the disclosure is not limited thereto. Similarly, the data signals received by the data line DL2 and the data line DL3 may have different polarities. That is, the data signal received by the data line DL2 may be the negative polarity, and the data signal received by the data line DL3 coupled to the second fan-out FL2 may be the positive polarity, but the disclosure is not limited thereto. Therefore, the polarities of the data signals received by the data lines DL1~DLN may be a column inversion.

In the embodiment, the data signals received by the data line DL1 and the data line DL3 may correspond to the data signals transmitted by the second fan-out line FL2, the data signal received by the data line DL6 and the data line DL8 may correspond to the data signals transmitted by the first fan-out line FL3, . . . the data signals received by the data line DLN-3 and the data line DLN-1 may correspond to the data signals transmitted by the fan-out line FLM.

It can be seen that, in the embodiment, the polarities of the data signals transmitted by the fan-out lines FL1~FLM are set to the square inversion, and the multiplexer 120 is used to adjust the data signals received by the data lines DL1~DLN to the column inversion from the square inversion. Therefore, it may reduce the feed-through effect generated by the multiplexer 120 when the multiplexer 120 is turned off, or improve the flicker phenomenon of the gray-level, or reduce the phenomenon of scrolling rainbow pattern generated at low frequencies.

Figure 2:
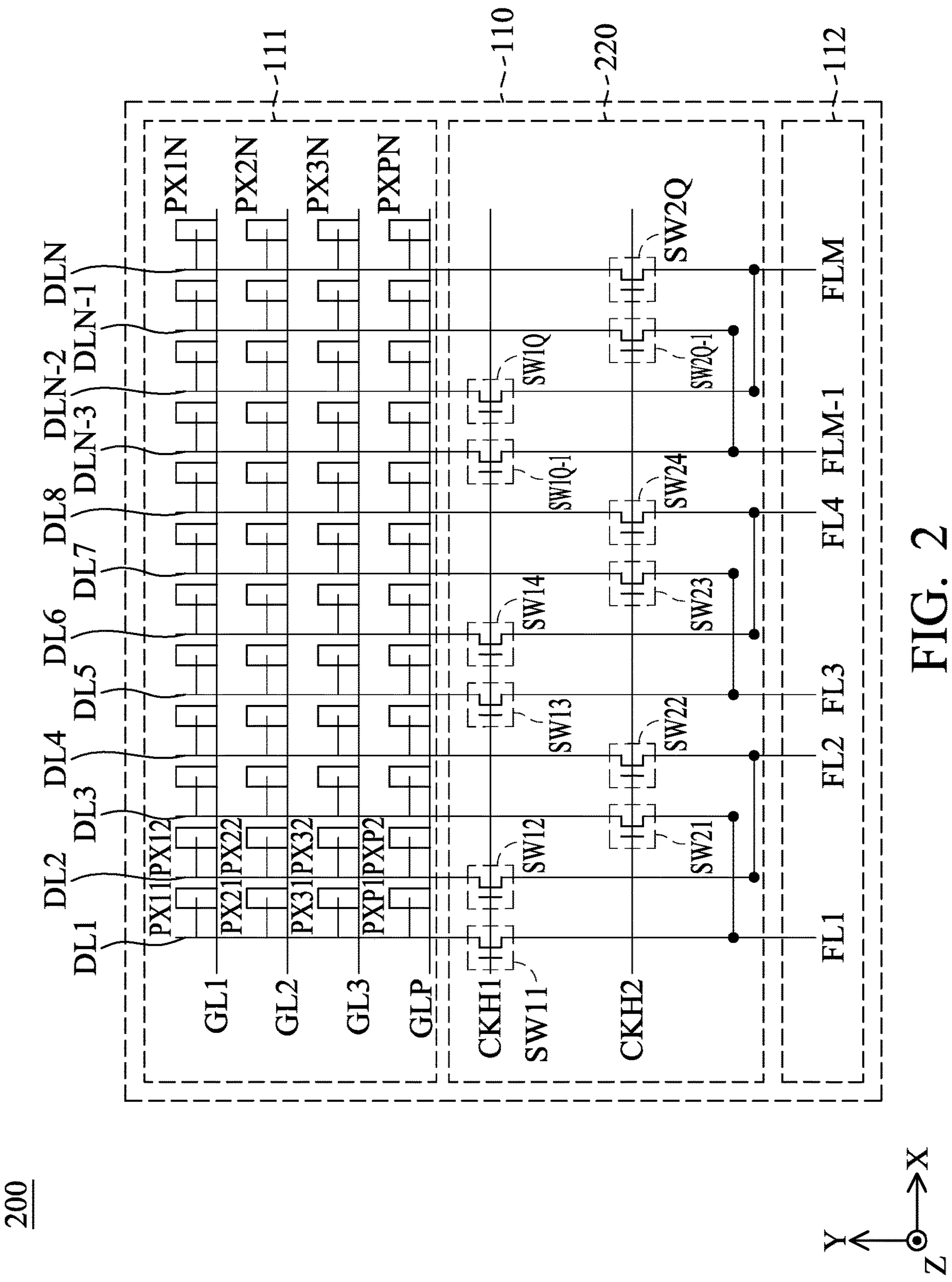
FIG. 2 is a schematic view of an electronic device according to an embodiment of the disclosure.
Figure 3:
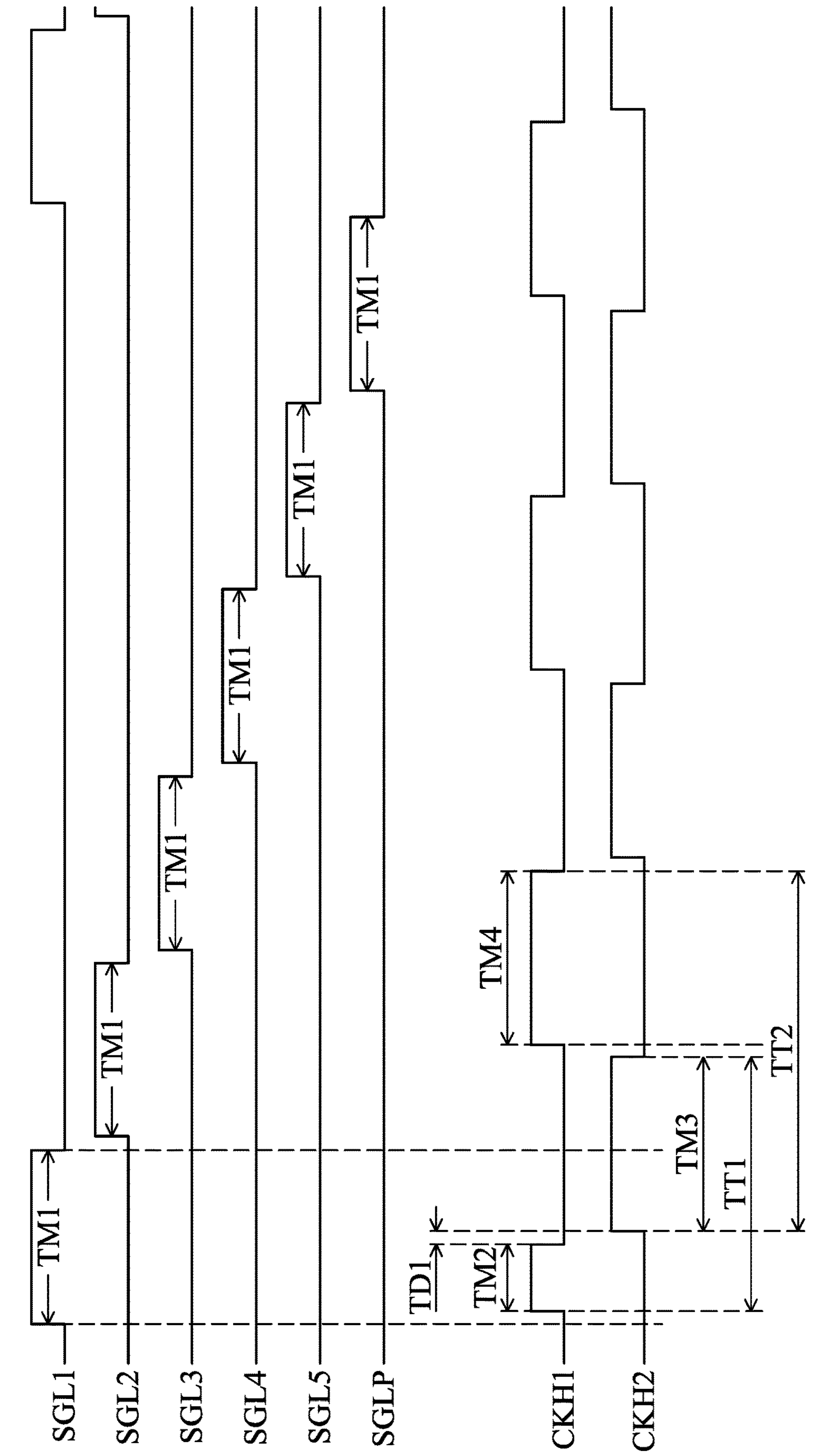
FIG. 3 is a timing diagram of scanning signals, a first control signal and a second control signal according to an embodiment of the disclosure.

FIG. 2 is a schematic view of an electronic device according to an embodiment of the disclosure. FIG. 3 is a timing diagram of scanning signals, a first control signal and a second control signal according to an embodiment of the disclosure. Please refer to FIG. 2. The electronic device 200 may at least include a substrate 110, a plurality of display units PX11~PXPN, a plurality of data lines DL1~DLN, a plurality of fan-out lines FL1~FLM and a multiplexer 220. In the embodiment, the substrate 110, the display units PX11~PXPN, the data lines DL1~DLN and the fan-out lines FL1~FLM in FIG. 2 are the same as or similar to the substrate 110, the display units PX11~PXPN, the data lines DL1~DLN and the fan-out lines FL1~FLM in FIG. 1. Accordingly, the substrate 110, the display units PX11~PXPN, the data lines DL1~DLN and the fan-out lines FL1~FLM in FIG. 2 may refer to the description of the embodiment in FIG. 1, and the description thereof is not repeated herein.

The multiplexer 220 in FIG. 2 is substantially similar to the multiplexer 120 in FIG. 1, and the main different is that the trace connection manner is different. In FIG. 2, the data line DL1 and the data line DL3 may be coupled to the first fan-out line FL1 through the multiplexer 220, the data line DL2 and the data line DL4 may be coupled to the second fan-out line FL2 through the multiplexer 220, the data line DL5 and the data line DL7 may be coupled to the first fan-out line FL3 through the multiplexer 220, and the data line DL6 and the data line DL8 may be coupled to the second fan-out line FL4 through the multiplexer 220. The rest of the data lines coupled to other fan-out lines through the multiplexer 220 may be deduced by analogy.

Furthermore, one of the display units PX11~PXPN may receive the scanning signals SGL1~SGLP through one of the scanning lines GL1~GLP, and one of the display units PX11~PXPN may receive the data signals according to the scanning signals SGL1~SGLP. For example, the display unit PX11 may receive the scanning signal SGL1 through the scanning line GL1 and turn on. Then, the display unit PX11 may receive the data signal to display the corresponding gray-level. The operations of the rest of the display units may be deduced by analogy.

In the embodiment, the multiplexer 220 may include first switches SW11~SW1Q and second switches SW21~SW2Q, wherein Q is a positive integer greater than 1. In the embodiment, each of the first switches SW11~SW1Q and the second switches SW21~SW2Q may include an N-type transistor, but the disclosure is not limited thereto. In other embodiments, each of the first switches SW11~SW1Q and the second switches SW21~SW2Q may include a P-type transistor or another suitable transistor.

The first switches SW11~SW1Q may receive the first control signal CKH1, and the first switches SW11~SW1Q may be turned on or turned off according to the first control signal CKH1, so as to transmit the corresponding data signal. The second switches SW21~SW2Q may receive the second control signal CKH2, and the second switches SW21~SW2Q may be turned on or turned off according to the second control signal CKH2, so as to transmit the corresponding data signal through the fan-out lines FL1~FLM.

As shown in FIG. 3, in some embodiments, the time lengths TM1 of the scanning signals SGL1~SGLP may be less than the sum TT1 or TT2 of the time lengths of the first control signal CKH1 and the second control signal CKH2, so that the multiplexer 220 may be a dancing MUX for dancing driving, but the disclosure is not limited thereto. For example, the time length TM1 of the scanning signal SGL1 may be less than the sum TT1 of the time length summed by the time length TM2 of the first control signal CKH1 and the time length TM3 of the second control signal CKH2. The time length TM1 of the scanning signal SGL2 may be less than the sum TT2 of the time length summed by the time length TM4 of the first control signal CKH1 and the time length TM3 of the second control signal CKH2. The time lengths of the rest of the scanning signals may be deduced by analogy. Therefore, it may reduce the feed-through effect generated by the multiplexer 220 when the multiplexer 220 is turned off (i.e., the first control signal CKH1 or the second control signal CKH2 is turned off), or improve the flicker phenomenon of the gray-level.

In FIG. 3, it can be seen that there is a time difference TD1 between the first control signal CKH1 and the second control signal CKH2, i.e., the transition time point of the first control signal CKH1 is not aligned with the transition time point of the second control signal CKH2, but the disclosure is not limited thereto. The transition of the above signal refers to the signal transition from the negative polarity (or a low logic level) to the positive polarity (or a high logic level) or the signal transition from the positive polarity (or the high logic level) to the negative polarity (or the low logic level). In some embodiments, there may be no interval time between the first control signal CKH1 and the second control signal CKH2, i.e., the transition time point of the first control signal CKH1 may be aligned with the transition time point of the second control signal CKH2. That is, the time difference TD1 may be zero (i.e., TD1=0). Therefore, by aligning the transition time point of the first control signal CKH1 with the transition time point of the second time point CKH2, the feed-through effect generated by the multiplexer 220 when the first control signal CKH1 or the second control signal CKH2 is turned off may be reduced.

In addition, the embodiment in FIG. 3 may be applied to the electronic device 100 in FIG. 1, and the same technical effect may be also achieved.

Figure 4:
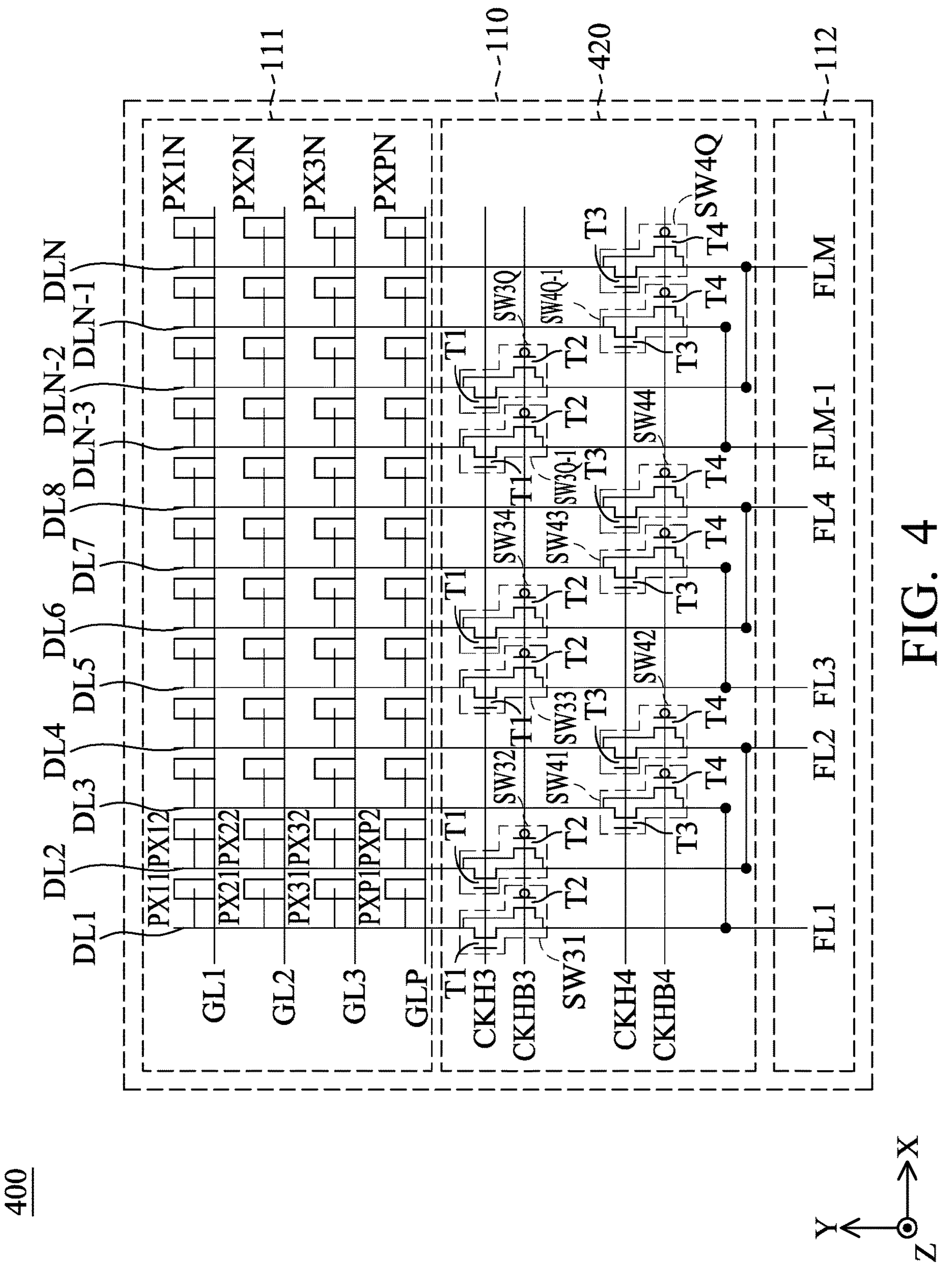
FIG. 4 is a schematic view of an electronic device according to an embodiment of the disclosure.
Figure 5:
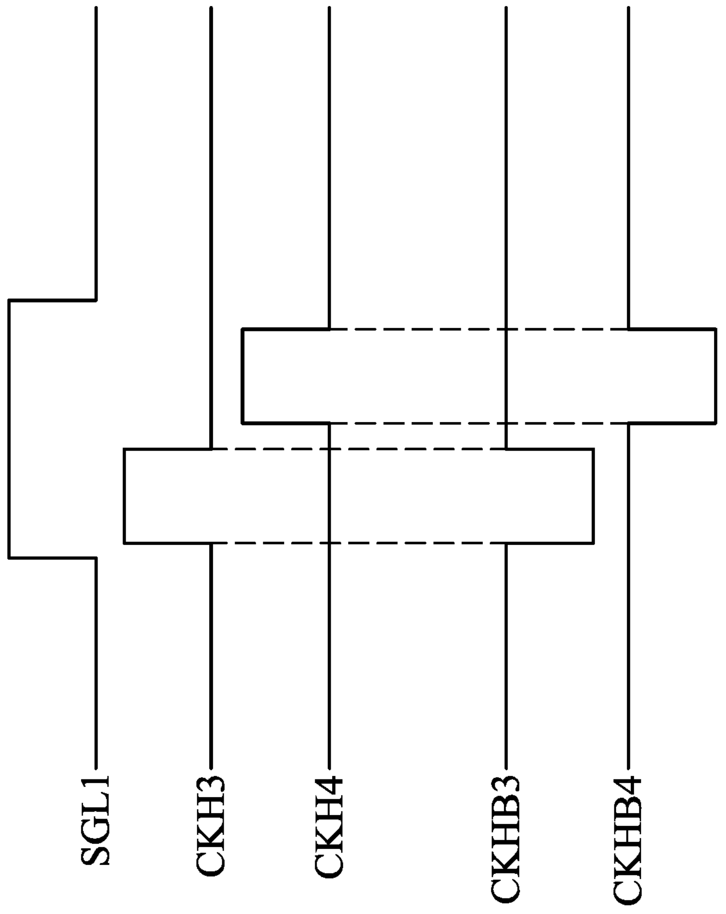
FIG. 5 is a timing diagram of scanning signals, a first control signal, a second control signal, a third control signal and a fourth control signal according to an embodiment of the disclosure.

FIG. 4 is a schematic view of an electronic device according to an embodiment of the disclosure. FIG. 5 is a timing diagram of a scanning signal, a first control signal, a second control signal, a third control signal and a fourth control signal according to an embodiment of the disclosure. Please refer to FIG. 4. The electronic device 400 may at least include a substrate 110, a plurality of display units PX11~PXPN, a plurality of data lines DL1~DLN, a plurality of fan-out lines FL1~FLM, a plurality of scanning lines GL1~GLP and a multiplexer 420. In the embodiment, the substrate 110, the display units PX11~PXPN, the data lines DL1~DLN, the fan-out lines FL1~FLM and the scanning lines GL1~GLP in FIG. 4 are the same as or similar to the substrate 110, the display units PX11~PXPN, the data lines DL1~DLN, the fan-out lines FL1~FLM and the scanning lines GL1~GLP in FIG. 2. Accordingly, the substrate 110, the display units PX11~PXPN, the data lines DL1~DLN, the fan-out lines FL1~FLM and the scanning lines GL1~GLP in FIG. 4 may refer to the description of the embodiment in FIG. 2, and the description thereof is not repeated herein.

The multiplexer 420 may include first switches SW31~SW3Q and second switches SW41~SW4Q, wherein Q is a positive integer greater than 1. In addition, each of the first switches SW31~SW3Q may include a first transistor T1 and a second transistor T2. The first transistor T1 may include a first terminal, a second terminal and a control terminal. The first terminal of the first transistor T1 of the first switch SW31 may be coupled to the data line DL1, the first terminal of the first transistor T1 of the first switch SW32 may be coupled to the data line DL2, the first terminal of the first transistor T1 of the first switch SW33 may be coupled to the data line DL5, the first terminal of the first transistor T1 of the first switch SW34 may be coupled to the data line DL6, . . . , the first terminal of the first transistor T1 of the first switch SW3Q-1 may be coupled to the data line DLN-3, and the first terminal of the first transistor T1 of the first switch SW3Q may be coupled to the data line DLN-2. The rest of the connections may be deduced by analogy.

The second terminal of the first transistor T1 of the first switch SW31 may be coupled to the first fan-out line FL1, the second terminal of the first transistor T1 of the first switch SW32 may be coupled to the second fan-out line FL2, the second terminal of the first transistor T1 of the first switch SW33 may be coupled to the first fan-out line FL3, the second terminal of the first transistor T1 of the first switch SW34 may be coupled to the second fan-out line FL4, . . . , the second terminal of the first transistor T1 of the first switch SW3Q-1 may be coupled to the fan-out line FLM-1, and the second terminal of the first transistor T1 of the first switch SW3Q may be coupled to the fan-out line FLM. The control terminals of the first transistors T1 of the first switches SW31~SW3Q may be coupled to each other.

The second transistor T2 may include a first terminal, a second terminal and a control terminal. The first terminal and the second terminal of the second transistor T2 of the first switch SW31 may be coupled to the first terminal and the second terminal of the first transistor T1 of the first switch SW31, the first terminal and the second terminal of the second transistor T2 of the first switch SW32 may be coupled to the first terminal and the second terminal of the first transistor T1 of the first switch SW32, the first terminal and the second terminal of the second transistor T2 of the first switch SW33 may be coupled to the first terminal and the second terminal of the first transistor T1 of the first switch SW33, the first terminal and the second terminal of the second transistor T2 of the first switch SW34 may be coupled to the first terminal and the second terminal of the first transistor T1 of the first switch SW34, . . . , the first terminal and the second terminal of the second transistor T2 of the first switch SW3Q-1 may be coupled to the first terminal and the second terminal of the first transistor T1 of the first switch SW3Q-1, and the first terminal and the second terminal of the second transistor T2 of the first switch SW3Q may be coupled to the first terminal and the second terminal of the first transistor T1 of the first switch SW3Q. The control terminals of the second transistors T2 of the first switches SW31~SW3Q may be coupled to each other.

In some embodiments, the type of the first transistor T1 may be different from the type of the second transistor T2. For example, the first transistor T1 may be an N-type transistor, and the second transistor T2 may be a P-type transistor, but the disclosure is not limited thereto.

In some embodiments, the first transistor T1 may receive a first control signal CKH3, i.e., the control terminal of the first transistor T1 may receive the first control signal CKH3. The second transistor T2 may receive a second control signal CKHB3, i.e., the control terminal of the second transistor T2 may receive the second control signal CKHB3. In addition, the polarity of the first control signal CKH3 is different from the polarity of the second control signal CKHB3, as shown in FIG. 5. For example, when the polarity of the first control signal CKH3 is a positive polarity, the polarity of the second control signal CKHB3 is a negative polarity. When the polarity of the first control signal CKH3 is the negative polarity, the polarity of the second control signal CKHB3 is the positive polarity. Therefore, the polarities of the first control signal CKH3 and the second control signal CKHB3 are different, so that the sudden drop in the voltage of the first transistor T1 and the sudden rise in the voltage of the second transistor T2 may be offset, so as to reduce the feed-through effect generated by the multiplexer 420 when the first transistor T1 is turned off.

Similar to the first switches SW31~SW3Q, each of the second switches SW41~SW4Q may include a third transistor T3 and a fourth transistor T4. The third transistor T3 may include a first terminal, a second terminal and a control terminal. The first terminal of the third transistor T3 of the second switch SW41 may be coupled to the data line DL3, the first terminal of the third transistor T3 of the second switch SW42 may be coupled to the data line DL4, the first terminal of the third transistor T3 of the second switch SW43 may be coupled to the data line DL7, the first terminal of the third transistor T3 of the second switch SW44 may be coupled to the data line DL8, . . . , the first terminal of the third transistor T3 of the second switch SW4Q-1 may be coupled to the data line DLN-1, and the first terminal of the third transistor T3 of the second switch SW4Q may be coupled to the data line DLN.

The second terminal of the third transistor T3 of the second switch SW41 may be coupled to the first fan-out line FL1, the second terminal of the third transistor T3 of the second switch SW42 may be coupled to the second fan-out line FL2, the second terminal of the third transistor T3 of the second switch SW43 may be coupled to the first fan-out line FL3, the second terminal of third transistor T3 of the second switch SW44 may be coupled to the second fan-out line FL4, . . . , the second terminal of the third transistor T3 of the second switch SW4Q-1 may be coupled to the fan-out line FLM-1, and the second terminal of the third transistor T3 of the second switch SW4Q may be coupled to the fan-out line FLM. The control terminals of the third transistors T3 of the second switches SW41~SW4Q may be coupled to each other.

The fourth transistor T4 may include a first terminal, a second terminal and a control terminal. The first terminal and the second terminal of the fourth transistor T4 of the second switch SW41 may be coupled to the first terminal and the second terminal of the third transistor T3 of the second switch SW41, the first terminal and the second terminal of the fourth transistor T4 of the second switch SW42 may be coupled to the first terminal and the second terminal of the third transistor T3 of the second switch SW42, the first terminal and the second terminal of the fourth transistor T4 of the second switch SW43 may be coupled to the first terminal and the second terminal of the third transistor T3 of the second switch SW43, the first terminal and the second terminal of the fourth transistor T4 of the second switch SW44 may be coupled to the first terminal and the second terminal of the third transistor T3 of the second switch SW44, . . . , the first terminal and the second terminal of the fourth transistor T4 of the second switch SW4Q-1 may be coupled to the first terminal and the second terminal of the third transistor T3 of the second switch SW4Q-1, and the first terminal and the second terminal of the fourth transistor T4 of the second switch SW4Q may be coupled to the first terminal and the second terminal of the transistor T3 of the second switch SW4Q. The control terminals of the fourth transistors T4 of the second switches SW41~SW4Q may be coupled to each other.

In some embodiments, the type of the third transistor T3 may be different from the type of the fourth transistor T4. For example, the third transistor T3 may be an N-type transistor, and the fourth transistor T4 may be a P-type transistor, but the disclosure is not limited thereto.

In some embodiments, the third transistor T3 may receive a third control signal CKH4, i.e., the control terminal of the third transistor T3 may receive the third control signal CKH4. The fourth transistor T4 may receive a fourth control signal CKHB4, i.e., the control terminal of the fourth transistor T4 may receive the fourth control signal CKHB4. In addition, the polarity of the third control signal CKH4 is different from the polarity of the fourth control signal CKHB4, as shown in FIG. 5. For example, when the polarity of the third control signal CKH4 is a positive polarity, the polarity of the fourth control signal CKHB4 is a negative polarity. When the polarity of the third control signal CKH4 is the negative polarity, the polarity of the fourth control signal CKHB4 is the positive polarity. Therefore, the polarities of the third control signal CKH4 and the fourth control signal CKHB4 are different, so that the sudden drop in the voltage of the third transistor T3 and the sudden rise in the voltage of the fourth transistor T4 may be offset, so as to reduce the feed-through effect generated by the multiplexer 420 when the third transistor T3 is turned off.

In addition, the structure of the switch of the multiplexer 420 in FIG. 4 including two different types of transistors may be applied to the multiplexer 120 of the electronic device 100 in FIG. 1, and the same technical effect may also be achieved.

In summary, according to the electronic device disclosed by the embodiments of the disclosure, one of the second fan-out lines is adjacent to two of the first fan-out lines, the data signal transmitted by the one of the second fan-out lines and the data signal transmitted by adjacent one of the first fan-out lines have the same polarity, the data signal transmitted by the one of the second fan-out lines and the data signal transmitted by adjacent another of the first fan-out lines have different polarities, and the data signals received by adjacent two of the data lines have different polarities. Therefore, it may reduce the feed-through effect generated by the multiplexer, or improve the flicker phenomenon of the gray-level, or reduce the phenomenon of scrolling rainbow pattern generated at low frequencies.

In addition, in an embodiment of the disclosure, the time length of the scanning signal may be less than the sum of time lengths of the first control signal and the second control signal received by the multiplexer, or there may be no interval time between the first control signal and the second control signal. Therefore, it may reduce the feed-through effect generated by the multiplexer, or improve the flicker phenomenon of the gray-level.

Furthermore, in an embodiment of the disclosure, the multiplexer may include the first switch and the second switch, the first switch may include the first transistor and the second transistor of different types, the second switch may include the third transistor and the fourth transistor of different types, the polarity of the first control signal received by the first transistor is different from the polarity of the second control signal received by the second transistor, the polarity of the third control signal received by the third transistor is different from the polarity of the fourth control signal received by the fourth transistor. Therefore, it may reduce the feed-through effect generated by the multiplexer.

While the disclosure has been described by way of examples and in terms of the preferred embodiments, it should be understood that the disclosure is not limited to the disclosed embodiments. On the contrary, it is intended to cover various modifications, combinations, and similar arrangements (as would be apparent to those skilled in the art). Therefore, the scope of the appended claims should be accorded the broadest interpretation to encompass all such modifications, combinations, and similar arrangements.

What is claimed is:

1. An electronic device, comprising:

a substrate, comprising an active area and a fan-out area;

an electrical component, disposed in the active area;

a plurality of data lines, disposed in the active area, wherein one of the data lines is coupled to the electrical component;

a plurality of fan-out lines, disposed in the fan-out area; and a multiplexer, disposed between the active area and the fan-out area, and coupled to the one of the data lines and one of the fan-out lines;

wherein the electronic device has various refreshing frequencies and is configured to use the multiplexer to control the one of the data lines to receive a data signal through the one of the fan-out lines, and the electrical component displays a corresponding gray-level according to the data signal.

2. The electronic device according to claim 1, wherein the fan-out lines are divided into a plurality of first fan-out lines and a plurality of second fan-out lines, and the first fan-out lines and the second fan-out lines are staggered along a direction.

3. The electronic device according to claim 2, wherein one of the second fan-out lines is adjacent to two of the first fan-out lines.

4. The electronic device according to claim 3, wherein the data signal transmitted by the one of the second fan-out lines and the data signal transmitted by adjacent one of the first fan-out lines have the same polarity, and the data signal transmitted by the one of the second fan-out lines and the data signal transmitted by adjacent another of the first fan-out lines have different polarities.

5. The electronic device according to claim 1, wherein the data lines are arranged along a direction.

6. The electronic device according to claim 5, wherein the data signals received by adjacent two of the data lines have different polarities.

7. The electronic device according to claim 1, further comprising:

a plurality of scanning lines, wherein one of the scanning lines is coupled to the electrical component, the electronic device receives a scanning signal through the one of the scanning lines, and the electronic device receives the data signal according to the scanning signal.

8. The electronic device according to claim 7, wherein the multiplexer comprises a first switch and a second switch, the first switch receives a first control signal, and the second switch receives a second control signal.

9. The electronic device according to claim 8, wherein a time length of the scanning signal is less than a sum of time lengths of the first control signal and the second control signal.

10. The electronic device according to claim 1, wherein the multiplexer comprises a first switch and a second switch, the first switch receives a first control signal, and the second switch receives a second control signal.

11. The electronic device according to claim 10, wherein there is no interval time between the first control signal and the second control signal.

12. The electronic device according to claim 10, wherein there is a time difference between the first control signal and the second control signal.

13. The electronic device according to claim 1, wherein the multiplexer comprises a first switch and a second switch, the first switch comprises a first transistor and a second transistor, and the second switch comprises a third transistor and a fourth transistor.

14. The electronic device according to claim 13, wherein a type of the first transistor is different from a type of the second transistor.

15. The electronic device according to claim 13, wherein the first transistor receives a first control signal, and the second transistor receives a second control signal.

16. The electronic device according to claim 15, wherein a polarity of the first control signal is different from a polarity of the second control signal.

17. The electronic device according to claim 13, wherein a type of the third transistor is different from a type of the fourth transistor.

18. The electronic device according to claim 13, wherein the third transistor receives a third control signal, and the fourth transistor receives a fourth control signal.

19. The electronic device according to claim 18, wherein a polarity of the third control signal is different from a polarity of the fourth control signal.

20. The electronic device according to claim 1, wherein polarities of the data signals transmitted by the fan-out lines are set to a square inversion, and polarities of the data signals received by the data lines are set to a column inversion.

* * * * *